United States Patent
Lorati

(10) Patent No.: US 8,864,354 B2
(45) Date of Patent: Oct. 21, 2014

(54) POMPON HAVING ELONGATE LIGHT-EMITTING-OBJECTS

(75) Inventor: David Lorati, Portland, OR (US)

(73) Assignee: School Specialty Co. of Oregon, Inc., Portland, OR (US)

( * ) Notice: Subject to any disclaimer, the term of this patent is extended or adjusted under 35 U.S.C. 154(b) by 0 days.

(21) Appl. No.: 12/118,609

(22) Filed: May 9, 2008

(65) Prior Publication Data

US 2008/0278929 A1   Nov. 13, 2008

Related U.S. Application Data

(60) Provisional application No. 60/916,948, filed on May 9, 2007.

(51) Int. Cl.
| | | |
|---|---|---|
| F21V 7/04 | (2006.01) | |
| F21V 23/00 | (2006.01) | |
| F21V 33/00 | (2006.01) | |
| F21L 4/00 | (2006.01) | |
| D04D 7/04 | (2006.01) | |

(52) U.S. Cl.
CPC . *F21L 4/00* (2013.01); *F21V 23/00* (2013.01); *F21V 33/0004* (2013.01); *D04D 7/04* (2013.01)
USPC .............................. 362/554; 362/557; 362/565

(58) Field of Classification Search
CPC ...... G02B 6/04; G02B 6/0006; G02B 6/4298; G02B 6/001; G02B 6/0001; G02B 6/0005; F21L 14/026
USPC ........................... 362/551, 554, 557, 565, 582
See application file for complete search history.

(56) References Cited

U.S. PATENT DOCUMENTS

| | | | | |
|---|---|---|---|---|
| 3,644,725 | A * | 2/1972 | Lochridge, Jr. | 362/556 |
| 4,055,840 | A * | 10/1977 | Uchytil et al. | 340/321 |
| D284,487 | S | 7/1986 | Pratt | |
| 4,924,358 | A | 5/1990 | Von Heck | |
| 4,967,321 | A * | 10/1990 | Cimock | 362/101 |
| 5,079,046 | A | 1/1992 | Kessler | |
| 5,590,884 | A | 1/1997 | Goldberg | |
| 5,606,637 | A * | 2/1997 | Dolby | 385/115 |
| 5,962,086 | A | 10/1999 | Offen | |
| 6,161,328 | A | 12/2000 | Sing | |
| 6,176,756 | B1 | 1/2001 | Panec | |
| 6,447,857 | B1 * | 9/2002 | Roberts et al. | 428/4 |
| D525,904 | S | 8/2006 | Killen et al. | |
| 7,182,483 | B2 | 2/2007 | Stern et al. | |
| 2002/0141200 | A1 | 10/2002 | Pan | |
| 2002/0174838 | A1 * | 11/2002 | Crane et al. | 119/707 |
| 2004/0255431 | A1 | 12/2004 | Cooke et al. | |
| 2005/0024893 | A1 * | 2/2005 | Wainwright | 362/567 |
| 2005/0191438 | A1 | 9/2005 | Tarasuk | |
| 2005/0254244 | A1 | 11/2005 | Stern et al. | |
| 2007/0017893 | A1 | 1/2007 | Ihli | |

* cited by examiner

*Primary Examiner* — Julie Bannan
(74) *Attorney, Agent, or Firm* — Kolisch Hartwell, P.C.

(57) ABSTRACT

In one embodiment, a light-emitting pompon including a handle, a plurality of flexible streamers, and a plurality of elongate light-emitting objects is provided. The handle may include a first end and a second end and the plurality of streamers may extend from the first end of the handle. The plurality of elongate light-emitting objects may extend from the first end of the handle. In some embodiments, the plurality of elongate light-emitting objects may be flexible. A light source may be disposed in the handle. The light source may be configured to emit light towards the first end of the handle such that the emitted light enters into and is dispersed out of the plurality of light-emitting objects. In some embodiments, the light source may be spaced from the plurality of elongate light-emitting objects.

9 Claims, 2 Drawing Sheets

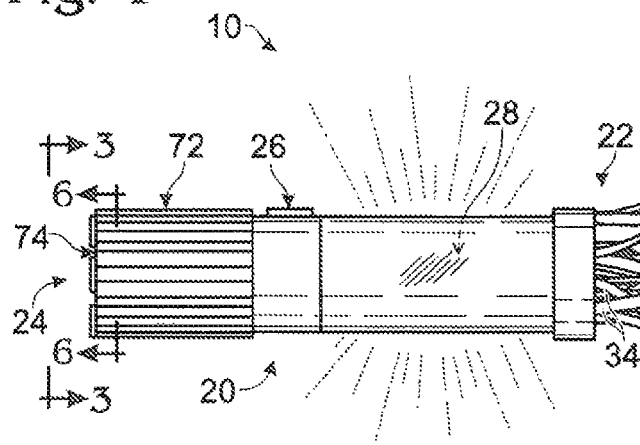
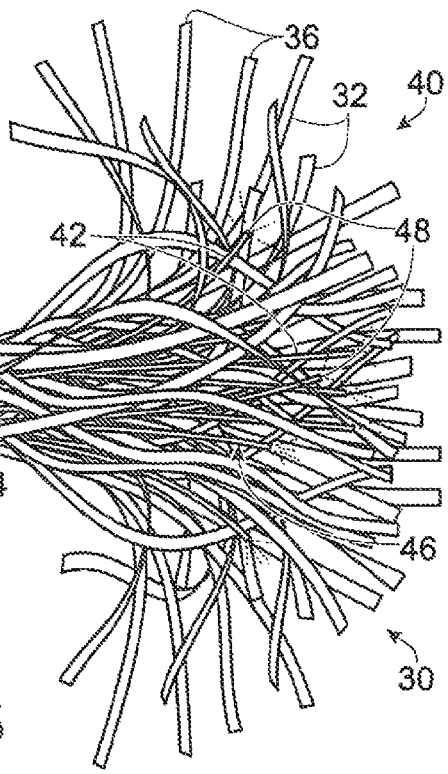
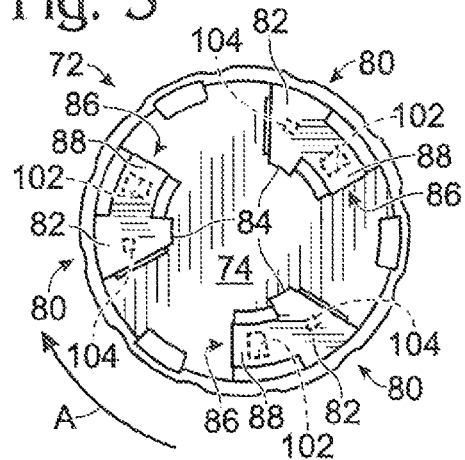
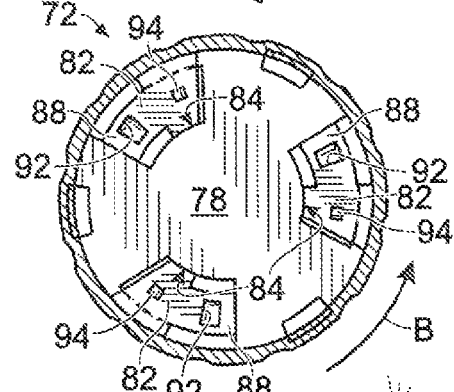
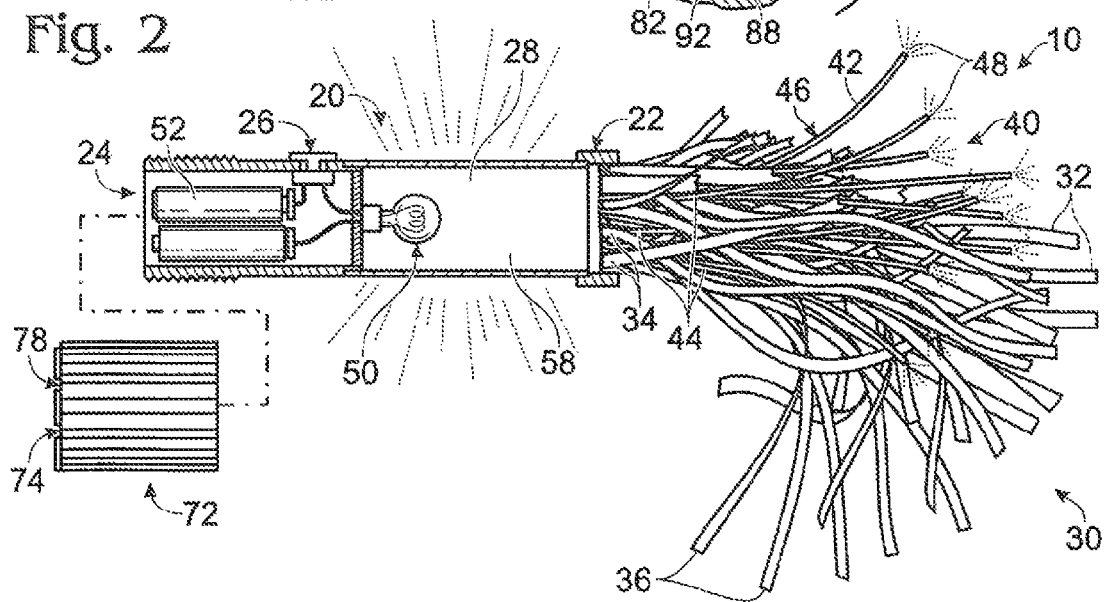

POMPON HAVING ELONGATE LIGHT-EMITTING-OBJECTS

RELATED APPLICATIONS

This application claims the benefit of U.S. Provisional Application No. 60/916,948, filed May 9, 2007, incorporated herein by reference in its entirety for all purposes.

BACKGROUND

The present disclosure relates generally to pompons, specifically to pompons having light-emitting objects. Pompons—long a mainstay of sporting or other public events—are used typically to provide psychological support for one or more participants of the event. Sometimes referred to as "pom-pom" or "pompom", pompons traditionally include a plurality of streamers bound together at one end. The streamers are typically made of paper, plastic, or some other highly flexible material. Other pompons include handles which serve the dual purposes of binding the streamers together at one end and providing the user with a means for holding the pompon.

Examples of pompons and methods of manufacturing pompons are disclosed in U.S. Pat. No. 6,012,820, issued to Weber et al., and U.S. Pat. No. 5,997,966, issued to Sadur, the disclosures of which are incorporated by reference.

SUMMARY

In one embodiment, a light-emitting pompon including a handle, a plurality of flexible streamers, and a plurality of elongate light-emitting objects is provided. The handle may include a first end and a second end and the plurality of streamers may extend from the first end of the handle. The plurality of elongate light-emitting objects may extend from the first end of the handle. A light source may be disposed in the handle. The light source may be configured to emit light towards the first end of the handle such that the emitted light enters into and is dispersed out of the plurality of light-emitting objects. In some embodiments, the light source may be spaced from the plurality of elongate light-emitting objects.

In another embodiment, a light-emitting pompon having a handle, a plurality of flexible streamers extending from the handle and a plurality of elongate light fibers is provided. The plurality of elongate light fibers may have a fixed end secured to the handle and a free end including an at least partially light permeable length extending outside of the handle, wherein the free ends are at least partially dispersed among the plurality of streamers. A light source may be configured to emit light towards the fixed ends of the plurality of elongate light fibers such that the emitted light enters into the fixed ends and is dispersed out of the at least partially light permeable length of the light fibers. The light source may not be electrically connected to the fixed ends of the plurality of elongate light fibers.

BRIEF DESCRIPTION OF THE DRAWINGS

FIG. 1 depicts an embodiment of the present disclosure with the light source activated, the embodiment having a connector at one end of the handle and a plurality of streamers and elongate light-emitting objects extending from the other end.

FIG. 2 depicts a cut-out view of the embodiment of FIG. 1, showing the interior of the handle and the elongate light-emitting objects dispersed among the streamers.

FIG. 3 shows a view of a pompon connector from the plane 3 of FIG. 1.

FIG. 6 is a view of the pompon connector viewed from plane 6 of FIG. 1, showing the underside of the apparatus for connection.

DETAILED DESCRIPTION

Figure 4:
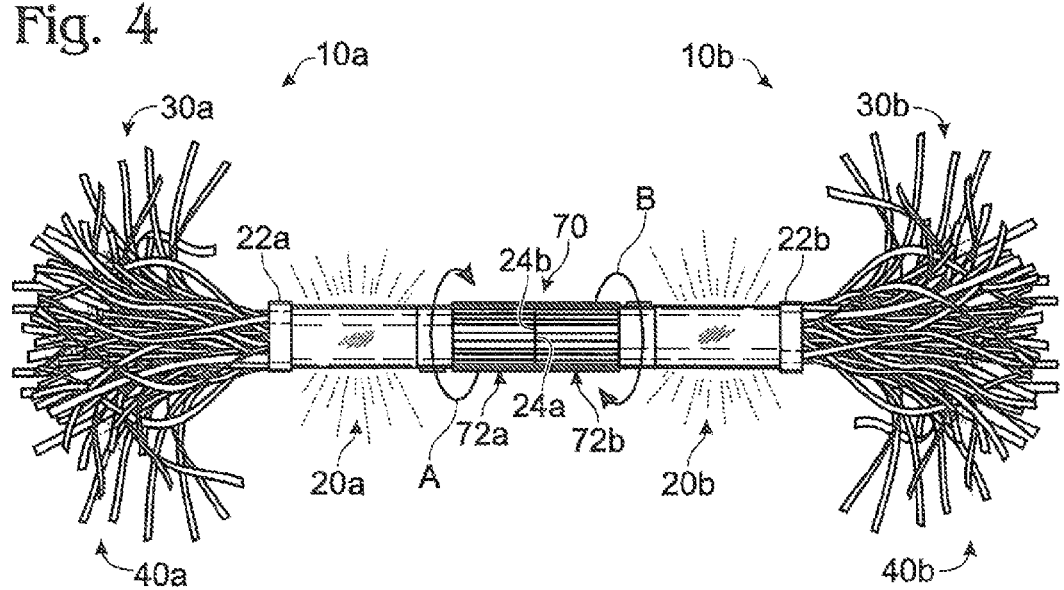
FIG. 4 depicts two pompons in accordance with the present disclosure being connected at their free ends with two connectors similar to the connector shown in FIG. 3.

FIG. 1 shows a pompon, with a body indicated generally at 10, in accordance with the present disclosure. Pompon 10 may include a handle 20, a plurality of long flexible members 30 (hereafter referred to as "streamers"), and/or a plurality of elongate light-emitting objects 40 interspersed among streamers 40.

Handle 20 may include a first end 22, a second end 24, a switch 26, and an interior 28. Each streamer 32 in the plurality of streamers 30 may have a proximal end 34 and a distal end 36. Streamers 30 may extend, at their proximal ends 34, from at least partially within interior 28 of handle 20, through first end 22 of handle 20, and distal ends 36 may extend away freely from handle 20. Additionally and/or alternatively, streamers 30 may extend through second end 24 of handle 20.

Interspersed among streamers 30 may be a plurality of elongate light-emitting objects 40. As best seen in FIG. 2, an elongate light-emitting object 42 may have a proximal end 44, a distal end 48, and a middle portion 46 extending therebetwaeen, all of which may be configured to emit or disperse light. Proximal ends 44 of elongate light-emitting objects 40 may be disposed or fixed adjacent to proximal ends 34 of the streamers at least partially within interior 28 of handle 20. Proximal ends 44 may be fixedly held with respect to one another within interior 28 of handle 20. Distal ends 48 of elongate light-emitting objects 40 may extend away freely from handle 20.

In some embodiments, second end 24 of handle 20 may be free. In other embodiments, a second plurality of streamers, which may be identical or similar to first plurality of streamers 30, and a second set of elongate light-emitting objects, identical or similar to first plurality of elongate light-emitting objects 40, may extend from second end 24 of handle 20

Handle 20 may be constructed of any suitable material(s) known to those skilled in the art. For example, some embodiments may have handles 20 made of a rigid plastic. Other embodiments may have handles 20 made of a firm rubber material having a soft outer surface, allowing for safe projection of the pompons through the air. First end 22 and/or second end 24 may be removable from handle 20, allowing for access to interior 28 of handle 20. Such access may allow a user to replace interior components, such as a light source 50 or a power source 52

Handle 20 may be configured to be held by a user such that movement of handle 20 imparts a motion onto plurality of streamers 30 and plurality of elongate light-emitting objects 40. Because distal ends 36 of the streamers and distal ends 48 of elongate light-emitting objects 40 may be unattached, streamers 30 and elongate light-emitting objects 40 may be free to move around in all directions.

In one embodiment, elongate light-emitting objects 40 are flexibly configured to approximate the movement of streamers 30. Even in low-light or darkness, where streamers 30 may not be visible, elongate light-emitting objects 40 may be constructed to move with the streamers to provide a visually-distinctive effect and/or to make the streamers visible.

Elongate light-emitting objects 40 may include clear, and/or light permeable, plastic light rods, such as fiber-optic strands, light fibers, and/or any other elongate object capable of emitting light along some or all of an elongate length and/or end portion. In other words, light entering one end of an elongate light-emitting object may at least partially defuse or reflect out of a length of the light-emitting object. Such rods or fibers are well known in the art.

Elongate light-emitting objects may have a uniform width or, alternatively, a width that may vary along the length of the elongate light-emitting object. Elongate light-emitting objects 40 may be flexible such that movement of the handle may impart movement to the elongate light-emitting objects. Additionally, elongate light-emitting objects 40 may be of any length, including longer than, shorter than, or equal to the length of streamers 30. Further, individual elongate light-emitting objects 42 may be of varying lengths, or they may all be the same length.

In one embodiment, elongate light-emitting objects 40 are configured so that distal ends 48 extend further from first end 22 of handle 20 than do distal ends 36 of the streamers. This configuration may ensure that distal ends 48 are not hidden by streamers 30, particularly when elongate light-emitting objects 40 are emitting light from distal ends 48.

FIG. 2 shows interior 28 of handle 20. A light source 50 and a power source 52 may be disposed therein. In some embodiments, light source 50 may be separated from proximal ends 44 of elongate light-emitting objects 40 by a free space 58. Additionally and/or alternatively, light source 50 may not be electrically connected to elongate light-emitting objects 40. As seen in FIGS. 1, 2 and 4, handle 20 may include translucent material, such that light may emit from handle 20 when light source 50 is illuminated.

A switch 26 on handle 20 may be coupled to power source 52 and light source 50. Actuation of switch 26 may activate power source 52 to provide power to light source 50, which will in turn emit light towards the proximal ends 44 of the elongate light-emitting objects 40. Additionally or alternatively, power source 52 may be activated by any other means known to those skilled in the art, including a push button, heat sensor, and/or motion sensor.

Power source 52 may include any known power source known to those skilled in the art. In the embodiment depicted in FIG. 2, power source 52 includes one or more batteries that may be removable from the interior 28 upon decoupling of either first end 22 or second end 24 from handle 20. In other embodiments, power source 52 may be rechargeable.

Light source 50 may include any known light source known to those skilled in the art and may emit one or more forms of light. In an exemplary embodiment shown in FIG. 2, light source 50 is an incandescent light bulb. In other embodiments, light source 50 may include a halogen lamp, a light-emitting diode, and/or a black light. It should be understood that any mechanism configured to emit light at any wavelength may be utilized in an embodiment of the present disclosure.

There may be more than one light source 50. In many embodiments, there will be a greater number of elongate light-emitting objects than light sources 50, thus creating a manifold effect of light from light source 50 to light-emitting objects 40. One or more proximal ends of one or more light-emitting objects may be located away from a light source. This configuration has been found to provide sufficient light to the light-emitting objects to produce the desired effect. To increase efficiency of light transmission from a light source to one or more elongate light-emitting objects, one or more proximal ends of the light-emitting objects may be coupled adjacent the light source.

Light source 50 may emit light directed towards proximal end 44 of elongate light-emitting object 42. Light may propagate from proximal end 44, through middle portion 46, and/or distal end 48. In some embodiments, light from light source 50 may emit outwardly from distal end 48 of elongate light-emitting object 40. Additionally and/or alternatively, light from light source 50 may emit outwardly from middle portion 46. In the embodiments of pompon 10, wherein elongate light-emitting objects 40 are flexible, light from light source 50 may propagate through the length of light-emitting objects 40, even where light emitting objects 40 are flexed into a non-straight configuration.

A pompon in accordance with the present disclosure may include a memory including instructions, and/or a processor to perform those instructions. The processor may be configured to control and/or direct a light source to emit light in various timed sequences or patterns. The processor may control or direct a light source to illuminate a first subset of elongate light-emitting objects to emit light at a first point in time, and then a second subset of elongate light-emitting objects to emit light at a second point in time. First subset and second subset, and first point and second point may overlap and/or occur simultaneously.

Pompon 10 may include a sound device coupled to power source 52. The sound device may include a speaker and may be coupled to the memory and/or the processors. The processor may perform instructions contained in the memory that causes the sound device to play sound files. The sound device may be activated by switch 26, a second switch and/or any other known means of activation.

As depicted in FIGS. 1-6, pompon 10 may include a connection apparatus 70 for connecting second ends 24 of two or more pompons 10 together. Connection apparatus 70 may include a connector 72 disposed on second end 24 of pompon 10.

FIG. 4 shows two pompons in accordance with the present disclosure connected together via connection apparatus 70. Each pompon may include a second end (24a and 24b) having a connector (72a and 72b). As denoted by rotational arrows A and B, connectors 72a and 72b may be connected by rotating one or both of the connectors in opposite directions.

While shown in relation to connecting pompons, it should be understood that one or more connectors may be used in any number of contexts. In one example, connectors may be affixed to the ends of two sword handles opposite the blades, allowing the user to assemble the two separate toy swords into a double-sword. In another example, a variation of connectors may be disposed on building blocks so that the user may rotatively connect multiple blocks into various configurations. Additionally and alternatively, connectors may be used in any application, leisure or otherwise, where connecting two pieces is required.

Figure 5:
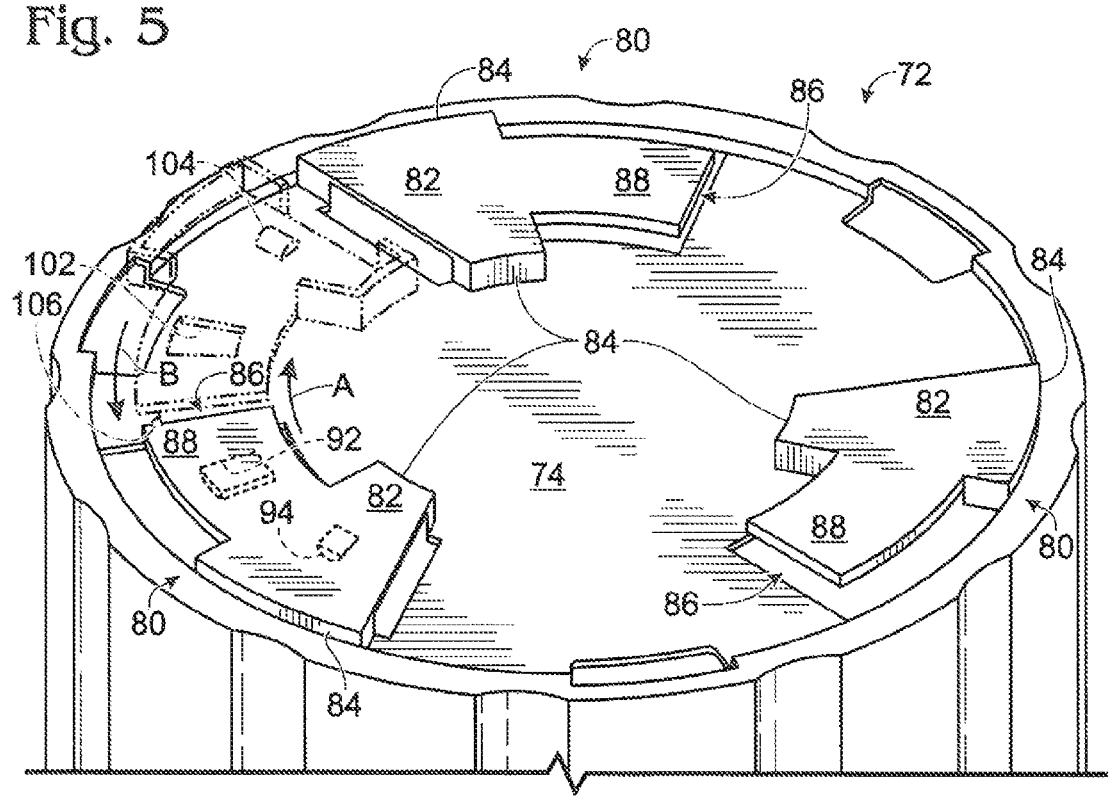
FIG. 5 is a close-up view of the apparatus for connecting on the end of the connector.

FIG. 3 depicts connector 72 from plane 3 in FIG. 1. FIG. 5 depicts connector 72 from a different angle and close-up. Connector 72 may include a plurality of interlocking members 80 on a planar end surface 74. Interlocking member 80 may include an upper planar member 82, at least one supporting member 84, a receiving portion 86, and an extending member 88 adjacent to upper planar member 82. Upper planar member 82 and extending member 88 may extend parallel to and slightly separated from planar end surface 74 of connector 72. Upper planar member 82 and extending member 88 may be coupled to planar end surface 74 by at least one supporting member 84, which extends transversely between planar end surface 74 and upper planar member 82.

Receiving portion 86 may include a space between upper planar and extending members (82 and 88) and planar end surface 74, as defined by one or more supporting members 84. Receiving portion 86 may be configured to receive an extending member from a second connector.

FIG. 6 shows an underside 78 of planar end surfaces 74 of connector 72, viewed from plane 6 of FIG. 1. The undersides of upper planar members 82 and extending members 88 are visible. Catches may be disposed on the surface of the underside of the upper planar members 82 and the extending members 88. A receiving catch 92 may be depressed into the surface of the underside of the extending members 88 in a female configuration. A protruding catch 94 may protrude out from the underside of the upper planar members 82 in a male configuration. It should be understood that any catch may be configured to be male or female, so long as a corresponding second catch on another connector 72 has the opposite configuration.

Referring now to FIG. 5, connector 72 may be attached to a second connector (of which part is shown in relief). The connectors may be positioned so that upper planar member 82 and extending member 88 of connector 72 are parallel to and in close proximity with the planar end surface (not shown) of the second connector. Likewise, an upper planar member and an extending member of the second (phantom) connector may be parallel to and in close proximity with planar end surface 74 of connector 72. The connectors may be positioned so that an extending member 88 of the first connector 72 faces a receiving portion 106 of the second connector.

Once in position, connector 72 and the second connector may be rotated in opposite directions (shown in arrows A and B) so that extending member 88 of the first connector 72 slides into receiving portion 106 of the second connector. Likewise, an extending member of the second connector may slide into receiving portion 86 of the first connector 72.

Receiving catch 92 on connector 72 may be configured to engage a protruding catch 104 on the second connector. Protruding catch 94 on connector 72 may be configured to engage with a receiving catch 102 on the second connector. Upon rotation of connector 72 and the second connector in opposite directions (as shown by directional arrows A and B), the two connectors may snap into a fixedly and/or detachably coupled configuration.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. A light-emitting pompon for use with another light-emitting pompon, comprising;
    a body with a first end and a second end;
    a pompon connector associated with the second end of the body that is constructed to allow removable attachment to the second light-emitting pompon;
    plurality of flexible streamers;
    plurality of elongate light-emitting objects;
    a light source spaced from the plurality of elongate light-emitting objects;
    wherein the plurality of flexible streamers extends from at least the first end of the body;
    wherein the plurality of elongate light-emitting objects extends from the first end of the body, at least partially distributed among the plurality of streamers, and wherein each of the light-emitting objects is constructed from flexible material that is movable to form arc shapes that approximate the movement of the streamers during use;
    wherein the light source is disposed in the body, and configured to emit light towards the first end of the body such that the emitted light enters into and is dispersed out of the plurality of elongate light-emitting objects.

2. The light-emitting pompon of claim 1, wherein the body includes translucent material such that the body is at least partially illuminated by the light source.

3. The light-emitting pompon of claim 1, wherein the length of one or more of the plurality of elongate light-emitting objects is substantially the same as the length of one or more of the plurality of streamers.

4. The light-emitting pompon of claim 1, wherein a second plurality of elongate light-emitting objects extends from the second end of the body.

5. A light-emitting pompon comprising;
    a body;
    plurality of flexible streamers;
    plurality of elongate light-emitting fibers;
    a light source spaced from the fixed ends of the plurality of elongate light fibers;
    wherein the plurality of flexible streamers extends from the body;
    wherein the fixed ends of the elongate light fibers are each secured to the body and, and wherein the elongate fibers each include a free end including an at least partially light permeable length extending outside of the body, wherein the free ends are at least partially dispersed among the plurality of streamers, and wherein each of the light fibers is constructed from flexible material that is movable to form arc shapes that to approximate the movement of the streamers during use;
    wherein the light source is configured to emit light towards the fixed ends of the plurality of elongate light fibers such that the emitted light enters into the fixed ends and is dispersed out of the at least partially light permeable length of the light fibers;
    wherein the fixed ends of the plurality of elongate light fibers are not electrically connected to the light source and
    wherein the body is constructed to releasably attach to a second pompon.

6. The light-emitting pompon of claim 5, wherein the free end includes a light permeable distal end, wherein light is at least partially dispersed out of the distal end.

7. The light-emitting pompon of claim 5, wherein the body includes translucent material.

8. The light-emitting pompon of claim 1, wherein the light source consists of a single source that is used to emit the light that is dispersed out of the plurality of elongate light-emitting objects.

9. The light-emitting pompon of claim 5, wherein the light source consists of a single source that is used to emit the light that is dispersed out of the plurality of elongate light fibers.

\* \* \* \* \*